(12) United States Patent
Ruhle et al.

(10) Patent No.: US 12,467,354 B2
(45) Date of Patent: Nov. 11, 2025

(54) DETECTION AND PREDICTION OF SCREEN OUTS DURING DOWNHOLE FRACTURING OPERATIONS

(71) Applicant: Halliburton Energy Services, Inc., Houston, TX (US)

(72) Inventors: William Ruhle, Houston, TX (US); Dinesh Ananda Shetty, Houston, TX (US); Srividhya Sridhar, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 1147 days.

(21) Appl. No.: 17/371,497

(22) Filed: Jul. 9, 2021

(65) Prior Publication Data

US 2023/0009947 A1 Jan. 12, 2023

(51) Int. Cl.
*G06F 7/48* (2006.01)
*E21B 43/267* (2006.01)
*E21B 47/06* (2012.01)

(52) U.S. Cl.
CPC ............ *E21B 47/06* (2013.01); *E21B 43/267* (2013.01); *E21B 2200/20* (2020.05)

(58) Field of Classification Search
CPC .... E21B 2200/20; E21B 43/26; E21B 43/267; E21B 47/06; E21B 49/008; G06N 20/20; G06N 5/01
See application file for complete search history.

(56) References Cited

U.S. PATENT DOCUMENTS

| 5,105,659 | A | 4/1992 | Ayoub | |
| 9,658,357 | B2 | 5/2017 | Kabannik et al. | |
| 9,803,467 | B2 | 10/2017 | Tang et al. | |
| 10,036,233 | B2 * | 7/2018 | Tang | E21B 41/00 |
| 10,119,378 | B2 * | 11/2018 | Lesko | E21B 17/20 |
| 10,689,972 | B1 | 6/2020 | Zhao et al. | |
| 2016/0047215 | A1 | 2/2016 | Soliman et al. | |
| 2019/0153840 | A1 * | 5/2019 | Bacon | E21B 47/06 |
| 2019/0323341 | A1 | 10/2019 | Shen et al. | |

FOREIGN PATENT DOCUMENTS

WO  WO 2021/016412 A1  1/2021

OTHER PUBLICATIONS

Massaras et al., "Real-Time Advanced Warning of Screenouts With the Inverse Slope Method," Paper presented at the SPE International Symposium and Exhibition on Formation Damage Control, Lafayette, Louisiana, USA, Feb. 2012.

Yu et al., "A Data Driven Approach in Screenout Detection for Horizontal Wells," Paper presented at the SPE Hydraulic Fracturing Technology Conference and Exhibition, The Woodlands, Texas, USA, Feb. 2020.

* cited by examiner

*Primary Examiner* — Nithya J. Moll
(74) *Attorney, Agent, or Firm* — NOVAK DRUCE CARROLL LLP

(57) ABSTRACT

A system and method to predict or detect screen outs by measuring pressure conditions in the well in real-time, and that conducts mitigation of the condition. Pressure responses of the well are detected during a fracture operation. The system processes the pressure responses by removing the effects of non-screen out related factors. A mathematical model is applied to the pressure responses to detect or predict the screen out. In response to the screen out detection or prediction, corrective action may be initiated.

18 Claims, 6 Drawing Sheets

DETECTION AND PREDICTION OF SCREEN OUTS DURING DOWNHOLE FRACTURING OPERATIONS

FIELD OF THE DISCLOSURE

The present disclosure relates generally to the design of fracturing treatments for stimulating hydrocarbon production from subsurface reservoirs, and particularly, to techniques to detect or predict screen outs during those stimulation treatments.

BACKGROUND

In the oil and gas industry, a well that is not producing as expected may need stimulation to increase the production of subsurface hydrocarbon deposits, such as oil and natural gas. Hydraulic fracturing is a type of stimulation treatment that has long been used for well stimulation in unconventional reservoirs. A stimulation treatment operation may involve drilling a horizontal wellbore and injecting treatment fluid into a surrounding formation in multiple stages via a series of perforations or formation entry points along a path of a wellbore through the formation. During each stimulation treatment, different types of fracturing fluids, proppant materials (e.g., sand), additives and/or other materials may be pumped into the formation via the entry points or perforations at high pressures and/or rates to initiate and propagate fractures within the formation to a desired extent.

Sometimes a dangerous phenomenon known as a screen out can occur during the fracture operation. A screen out occurs when a fluid path is blocked by materials such as proppant, sand etc. leading to the increased resistance to the fluid flow, which can happen near the wellbore or far from the wellbore. The screen out may ultimately result in a blow out of the well. Therefore, especially for automated fracturing operations, it is imperative to detect the onset of a screen out and take an appropriate mitigation action in real time to complete the stimulation operation (i.e., pump all the planned proppant or pump the maximum proppant without causing wellbore screen-out). At present, human monitoring is used to detect the onset of screen-out which is very susceptible to oversight and error.

DESCRIPTION OF ILLUSTRATIVE EMBODIMENTS

Figure 1:
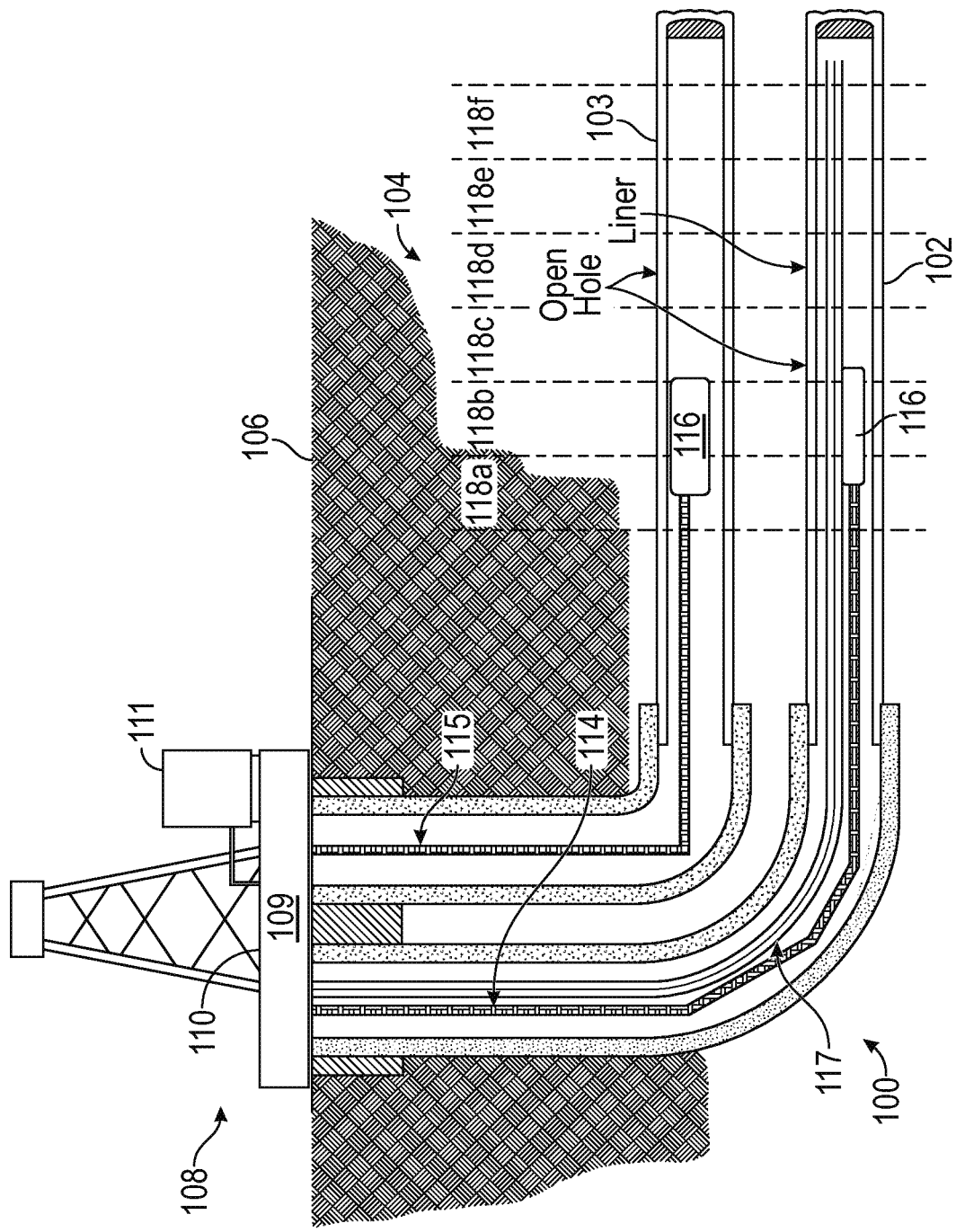
FIG. 1 is a diagram illustrating an example of a fracture treatment well system 100 in which methods of the present disclosure may be applied.

Embodiments of the present disclosure relate to prediction and detection of screen outs during fracture treatment operations. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As will be described in further detail below, embodiments and methods of the present disclosure may be used to predict and detect screen outs by measuring pressure conditions in the well in real-time, and conduct mitigation of the condition. In a generalized method, pressure responses of the well are detected during a fracture operation. The system then processes the pressure responses by removing the effects of non-screen out related factors in the pressure responses, such as density changes and friction. A mathematical model is then applied to the pressure responses to detect or predict the screen out. The mathematical model may take various forms including, for example, models which apply historical data or pressure trend data to detect or predict the screen outs. In response to the screen out detection or prediction, corrective action may be initiated such as, for example, reduction of slurry rate, altering proppant concentrations, altering rheologic properties of the fracturing slurry, or application of a chemical to the fracturing slurry.

Illustrative embodiments and related methodologies of the present disclosure are described below in reference to the examples shown in the following figures as they might be employed, for example, in a computer system for real-time detection of prediction of screen outs during fracture stimulation treatments. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While these examples may be described in the context of a multistage multi-well hydraulic fracturing treatment, it should be appreciated that the real-time screen out prediction and detection techniques are not intended to be limited thereto and that these techniques may be applied to other types of stimulation operations in which screen outs are a concern.

FIG. 1 is a diagram illustrating an example of a fracture treatment well system 100 in which methods of the present disclosure may be applied. As shown in the example of FIG. 1, well system 100 includes a first wellbore 102 and a second wellbore 103 in a subsurface formation 104 beneath a surface 106 of the wellsite. Wellbores 102 and 103 as shown in the example of FIG. 1 includes horizontal wellbores. However, it should be appreciated that embodiments are not limited thereto and that well system 100 may include any combination of horizontal, vertical, slant, curved, and/or other wellbore orientations. The subsurface formation 104 may include a reservoir that contains hydrocarbon resources, such as oil, natural gas, and/or others. For example, the subsurface formation 104 may be a rock formation (e.g., shale, coal, sandstone, granite, and/or others) that includes hydrocarbon deposits, such as oil and natural gas. In some cases, the subsurface formation 104 may be a tight gas formation that includes low permeability rock (e.g., shale, coal, and/or others). The subsurface formation 104 may be composed of naturally fractured rock and/or natural rock formations that are not fractured to any significant degree.

Well system 100 also includes a well pad 109 and fluid injection system 108 for injecting treatment fluid, e.g., hydraulic fracturing fluid or also referred to as "proppant slurry," into the subsurface formation 104 over multiple sections 118a, 118b, 118c, 118d, 118e and 118f (collectively referred to herein as "sections 118") of the wellbores 102 and 103, as will be described in further detail below. Each of the sections 118 may correspond to, for example, a different stage or interval of the multi-well multistage stimulation treatment. The boundaries of the respective sections 118 and corresponding treatment stages/intervals along the length of the wellbores 102 and 103 may be delineated by, for example, the locations of bridge plugs, packers and/or other types of equipment in the wellbores 102 and 103 (although, in other embodiments, they may not be delineated by any physical structure/equipment). Additionally, or alternatively, the sections 118 and corresponding treatment stages may be delineated by particular features of the subsurface formation 104. Although six sections are shown in FIG. 1, it should be appreciated that any number of sections and/or treatment stages may be used as desired for a particular implementation. Furthermore, each of the sections 118 may have different widths or may be uniformly distributed along wellbores 102 and 103. The wellbores 102 and 103 have open hole portions 119 and liners 120.

As shown in FIG. 1, injection system 108 includes an injection control subsystem 111, a signaling subsystem 114 installed in the first wellbore 102 and a signaling subsystem 115 installed in the second wellbore 103, and one or more injection tools 116 installed in wellbores 102 and 103. The injection control subsystem 11l can communicate with the injection tools 116 from a surface 110 of the wellbore 102 and 103 via the signaling subsystems 114 and 115 respectively. Although not shown in FIG. 1, injection system 108 may include additional and/or different features for implementing flow distribution monitoring, diversion control techniques, chemical injection, etc. For example, the injection system 108 may include any number of computing subsystems, communication subsystems, pumping subsystems, monitoring subsystems, blenders, manifolds, pressure and rate monitoring subsystems, and/or other features as desired for a particular implementation.

In some implementations, the wellbore 102 may include a fiber-optic sensor network 117 or other sensor(s) for collecting real-time pressure, temperature, acoustic measurements and/or other measurements downhole during the multi-well stimulation treatment. For example, the fiber-optic sensor network 117 may be components of a distributed acoustic sensing (DAS), and/or distributed strain sensing (DSS), and/or point pressure measurement sensing, and/or distributed temperature sensing (DTS) subsystems of the injection system 108. Each subsystem may consist of a fiber optic interrogator located on the surface and it may be connected to an optical fiber within the fiber optic sensor network. The fiber optic interrogator may operate in e.g. a pulsed state where one or several optical light pulses are sent down the optical fiber and back scattered or back reflected light may be collected, or the fiber optic interrogator may operate in a continuous wave mode where the light wavelength may be constant or swept over a wavelength range. The fiber optic interrogator may operate based on intensity, wavelength, frequency, phased based detection schemes as well as interferometric sensing based on homodyne, heterodyne, pseudo-random coding, random coding and/or cross-correlation schemes. The fiber optic interrogator may e.g. use Rayleigh scattering, coherent Rayleigh scattering, Brillouin scattering or Raman scattering sensing principles. The optical fibers may be multi-mode fibers, un-modified or modified single mode fibers where modifications may include periodic or non-periodic variations to the core or refractive index of the core.

In certain illustrative embodiments, the fiber-optic sensors 117 are adaptable to obtain real-time measurements and diagnostic data of both the first and/or second wellbores and/or additional production or monitoring wellbores during multi-well multistage stimulation treatments. Real-time measurement data may be, for example optical intensity measurements, optical wavelength measurements, optical frequency or phase measurements where the optical measurements can be used to derive temperature, pressure, acoustic, strain, micro-seismic, micro-deformation, or other formation related properties. Diagnostic data may be, for example, temperature vs. depth profiles, strain vs. depth profiles, acoustic intensity and/or frequency depth profiles, micro-seismic vs. 3D space in the vicinity of a treatment or monitoring wellbore, micro-deformation vs. 3D space in the vicinity of a treatment or monitoring wellbore, surface and/or subsurface pressure and this data can be used to monitor down-hole changes over time and space as the fracking operation progresses. The diagnostic data can be refined to e.g. flow rates across perforation clusters, fracture sizes/orientation and fracture growth rates, cross-well fluid and fracture communication, fracture complexity near wellbore and fracture complexity in the reservoir, fracture and fluid communication between formation layers in the reservoir where the refined diagnostics data can be used to control fracturing operations during single well and/or multi well fracturing operations. However, it should be appreciated that embodiments are not limited thereto and that a fiber-optic sensor network 117 can be disposed in the second wellbore 103 or a fiber-optic sensor network can be disposed in each wellbore 102 and 103 and/or additional wellbores (not shown).

In some implementations, the injection control subsystem 111 may be communicatively coupled to the fiber-optic sensor network 117. In some implementations, the fiber-optic sensor network 117 may be communicatively coupled to a separate processing and control unit (not shown). In some implementations, the injection control subsystem 111 may be communicatively coupled to a remote computing system (not shown) for exchanging information via a network for purposes of monitoring and detecting screen outs as described herein, and controlling wellsite operations, including operations related to the stimulation treatment. Such a network may be, for example and without limitation, a local area network, medium area network, and/or a wide area network, e.g., the Internet.

Thus, in the fiber-optics example above, the downhole data collected by the fiber-optic sensor network 117 may be transmitted to the injection control subsystem 111 and use the downhole data that it receives via the fiber-optic network 117 to perform real-time fracture mapping and/or real-time fracturing pressure interpretation using any of various data analysis techniques for monitoring stress fields around hydraulic fractures in wellbores 102 and 103.

In order to monitor subsurface characteristics (e.g., pressure) during a fracturing operation in certain embodiments, the fiber optic network may collect and process data from one or several of the subsystems. For example, distributed acoustic sensing data using e.g. coherent Rayleigh sensing principles can be collected e.g. every three feet along the fiber with a pulse repetition rate ranging from 1 kHz to 100 kHz. The acoustic data can be used for detecting microseismic events during the fracturing operation where pressure and/or shear waves from the microseismic events are mapped along the length of the optical fiber. The location of these events can be triangulated as the travel velocity of pressure and shear waves are known and travel velocity models can be refined by e.g. monitoring perforation events during the fracturing operation.

The microseismic events are caused by the fracturing operation as fractures are propagating in the formation and the rock breaks apart or rock planes slip/shift and result in micro-seismic events, and mapping these events in space and time will generate an event cloud of microseismic events in space. Various mathematical and/or statistical means can be used to calculate the azimuth of this event cloud, and the calculation can be done substantially in real-time. Similarly, the length of the event cloud and the height of the event cloud can be used as indications of fracture height and fracture length, or fracture network height and fracture network length or fracture network width. Similarly, mapping the growth rates of these properties (i.e., fracture mapping) will allow for an approximation of when a certain area or volume will be fractured. The fracture azimuth, fracture length or fracture network length, fracture height or fracture network height, and fracture width or fracture network width can also be used to determine if a fracturing operation is going as planned, or if a corrective action should be considered. The corrective action may include changing flow rates, pressures, proppant concentration, chemical concentration, diverter concentration and/or other parameters.

Pressure can also be measured at surface and/or in the subsurface domain, and the pressure measurements may be done with a frequency of up to 1,000 measurements per second or more. The measured pressure changes as fractures open and/or as pump flow rates change and/or as formation properties changes as a result of the fracturing operation, and this pressure can be measured and correlated with various distributed measurements. Corrective actions, such as those described herein, may be taken if a screen out condition is detected or predicted.

During each stage of the multi-well stimulation treatment, the injection system 108 may alter stresses and create a multitude of fractures in the subsurface formation 104 by injecting the proppant slurry into the surrounding subsurface formation 104 via a plurality of formation entry points along a portion of wellbores 102 and 103 (e.g., along one or more of sections 118). The fluid may be injected through any combination of one or more valves of the injection tools 116. The injection tools 116 may include numerous components including, but not limited to, valves, sliding sleeves, actuators, ports, and/or other features that communicate the treatment fluid from working strings disposed within wellbores 102 and 103 into the subsurface formation 104 via the formation entry points. The formation entry points may include, for example, open-hole sections along an uncased portion of the wellbore path, a cluster of perforations along a cased portion of the wellbore path, ports of a sliding sleeve completion device along the wellbore path, slots of a perforated liner along the wellbore path, or any combination of the foregoing.

The injection tools 116 may also be used to perform mitigation and diversion techniques in the event of a predicted or detected screen out, as will be described below. Examples of mitigation and diversion techniques include adjusting the downhole flow distribution of the treatment fluid across the plurality of formation entry points, reduction of the fluid injection rate, reduction of the proppant concentration in the fluid, holding the proppant concentration steady in the fluid, altering the rheological properties of the fluid (e.g., changing friction reducer or gel concentration) or application of a chemical (e.g., acid) etc. Thus, the flow of fluid and delivery of diverter material into the subsurface formation 104 during the multi-well stimulation treatment may be controlled by the configuration of the injection tools 116.

The mitigation or diverter material injected into the subsurface formation 104 may be, for example, a degradable polymer. Examples of different degradable polymer materials that may be used include, but are not limited to, polysaccharides; lignosulfonates; chitins; chitosans; proteins; proteinous materials; fatty alcohols; fatty esters; fatty acid salts; aliphatic polyesters; poly(lactides); poly(glycolides); poly($\varepsilon$-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates, and copolymers, blends, derivatives, or combinations thereof. However, it should be appreciated that embodiments of the present disclosure are not intended to be limited thereto and that other types of diverter materials may also be used.

The operation of the injection tools 116 may be controlled by the injection control subsystem 111. The injection control subsystem 111 may include, for example, data processing equipment, communication equipment, and/or other systems that control injection or other mitigation treatments applied to the subsurface formation 104 through wellbores 102 and 103. In one or more embodiments, the injection control subsystem 111 may receive, generate, or modify a baseline treatment plan for implementing the various stages of the stimulation treatment along the path of wellbores 102 and 103. The baseline treatment plan may specify initial parameters for the treatment fluid to be injected into the subsurface formation 104. The treatment plan may also specify a baseline pumping schedule for the treatment fluid injections and diverter deployments over each stage of the multi-well stimulation treatment.

In one or more embodiments, the injection control subsystem 111 initiates control signals to configure the injection tools 116 and/or other equipment (e.g., pump trucks, etc.) for operation based on the treatment plan. The signaling subsystems 114 and 115 as shown in FIG. 1 transmits the signals from the injection control subsystem 111 at the wellbore surface 110 to one or more of the injection tools 116 disposed in wellbores 102 and 103. For example, signaling subsystems 114 and 115 may transmit hydraulic control signals, electrical control signals, and/or other types of control signals. The control signals may be reformatted, reconfigured, stored, converted, retransmitted, and/or otherwise modified as needed or desired en route between the injection control subsystem 111 (and/or another source) and the injection tools 116 (and/or another destination). The signals transmitted to the injection tools 116 may control the configuration and/or operation of the injection tools 116.

Examples of different ways to control the operation of each of the injection tools 116 include, but are not limited to, opening, closing, restricting, dilating, repositioning, reorienting, and/or otherwise manipulating one or more valves of the tool to modify the manner in which treatment fluid, proppant, or diverter is communicated into the subsurface formation 104. It should be appreciated that the combination of injection valves of the injection tools 116 may be configured or reconfigured at any given time during the multi-well stimulation treatment. It should also be appreciated that the injection valves may be used to inject any of various treatment fluids, proppants, and/or diverter materials into the subsurface formation 104. Examples of such proppants include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and combinations thereof.

In one or more embodiments, the injection tools 116 may include one or more sensors for collecting data relating to downhole operating conditions and formation characteristics along the wellbores 102 and 103. Such sensors may serve as real-time data sources for various types of downhole measurements and diagnostic information pertaining to each stage of the multi-well stimulation treatment. Examples of such sensors include, but are not limited to, DTS, DAS, DSS, micro-seismic sensors, tiltmeters, pressure sensors, and other types of downhole sensing equipment. The data collected downhole by such sensors may include, for example, real-time measurements and diagnostic data to detect or predict screen outs as described herein. In addition, the data may be used for monitoring the extent of fracture growth and complexity within the surrounding formation along wellbores 102 and 103 during each stage of the multi-well stimulation treatment, e.g., corresponding to one or more sections 118. In some implementations, the injection tools 116 may include fiber-optic sensors for collecting real-time measurements of acoustic intensity and/or frequency and/or acoustic phase information or thermal energy downhole during the multi-well stimulation treatment in addition the fiber-optic sensor network 117 disposed in the wellbore. For example, the fiber-optic sensors may be components of a distributed acoustic sensing (DAS), distributed strain sensing (DSS), and/or distributed temperature sensing (DTS) subsystems of the injection system 108.

In yet another example, the injection control subsystem 111 may use real-time pressure measurements obtained from downhole and/or surface pressure sensors to perform real-time pressure diagnostics and analysis, which is used to predict or detect screen out conditions. The results of the analysis may then be used to determine whether any mitigation action is warranted. The injection control subsystem 111 in this example may also perform an analysis of surface treating pressure as well as friction analysis and/or other pressure diagnostic techniques to obtain a quantitative measure of the flow spread and number of simulated entry points.

It should be noted that the various analysis techniques in the examples above used to predict and detect screen out conditions are provided for illustrative purposes only and that embodiments of the present disclosure are not intended to be limited thereto. It should be noted that each of the above described analysis techniques may be used independently or combined with one or more other techniques.

Figure 2:
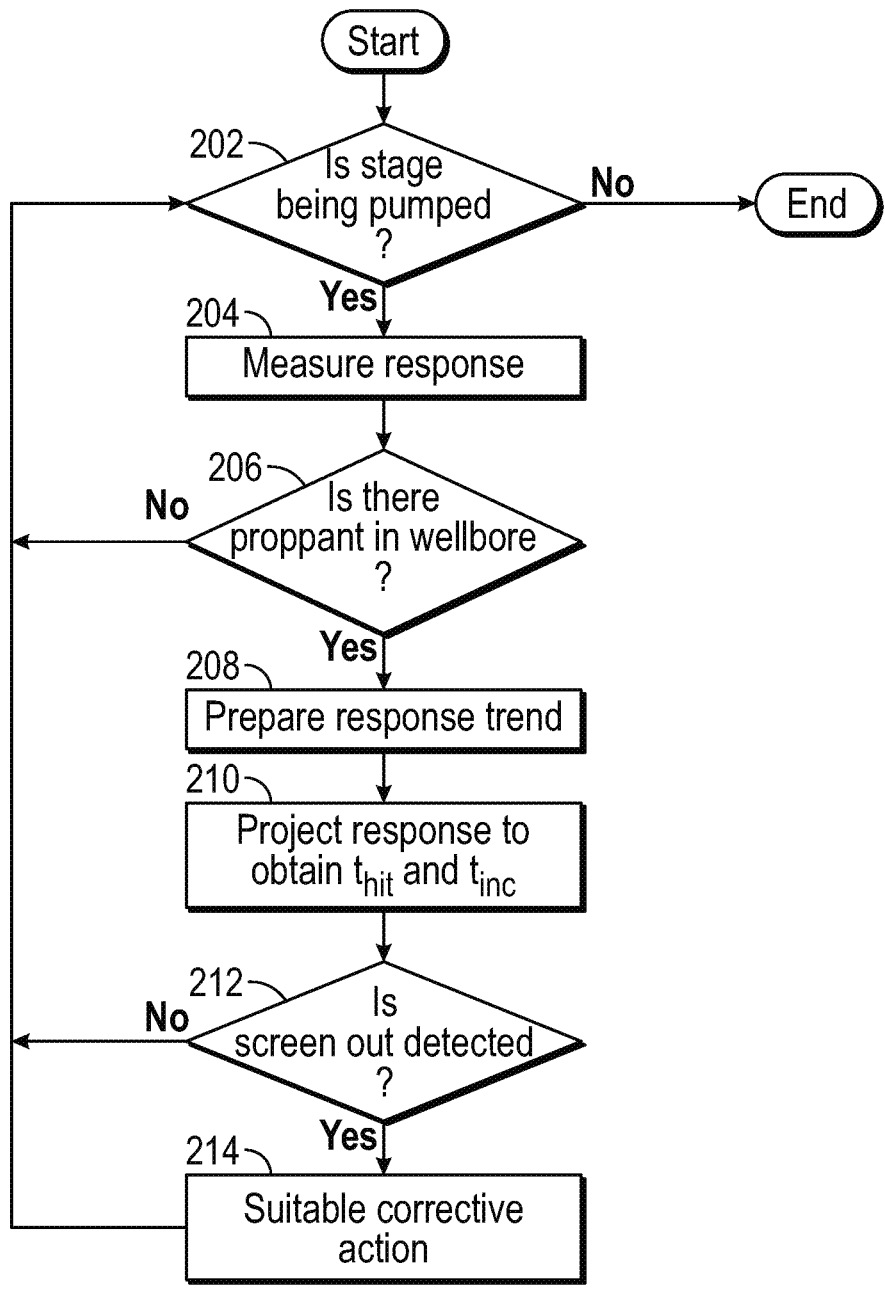
FIG. 2 is a flow chart of a method for detecting or predicting screen outs during a fracturing operation, according to certain illustrative methods of the present disclosure.

Now that one illustrative application of the present disclosure has been described, a detail explanation of the proposed methods will now be provided. The illustrative methods describe herein automatically determine the onset of screen-out by analyzing the pressure response from the well in real time to take an appropriate mitigation act. FIG. 2 is a flow chart of a method for detecting or predicting screen outs during a fracturing operation. At block 202, the control system (or some other processing circuitry) initializes and determines if a stage is being pumped. If the answer is "yes," the system then, using downhole or surface pressure sensors, obtains a downhole pressure response (P) of the hydraulic fracture operation (block 204) once the proppant or any other material that has the potential to create a screen out has started to flow in the wellbore. Then, based upon the pumping schedule (treatment plan), the system determines if proppant is flowing in the wellbore at block 206. Further based on the slurry rate, diameter of the well and measured distance to the fracturing stage from the wellbore, an estimate of how long it takes for the proppant to move through the wellbore can be obtained.

If proppant is flowing, at block 208, the system prepares the pressure response P by removing the effects of non-screen out related factors, such as density changes in the fluid system and frictional effects, as illustrated by:

$$\tilde{P}=P+P_h(p,TVD)-P_{fric}(Q,d,k',n',\ \ \ .\ \ \ .\ \ \ .\ \ \ )-P_{frac}(Q,E,\mu,\ldots)-\sigma_{net},\quad \text{Eq. 1,}$$

where $P_h$ is the hydrostatic pressure factor contribution, p is density, TVD is the total vertical depth, $P_{fric}$ is the friction factor pressure contribution, Q is the rate at which slurry (typically a mixture of water, chemicals and proppant, etc.) is being pumped into the wellbore at the surface, d is the inner diameter of the wellbore though which fluid is being pumped, k' is flow consistency index of the fluid, n' is flow behavior index of the fluid, $P_{frac}$ is fracture pressure contribution, E is Young's modulus of the formation, µ is effective fluid viscosity and $\sigma_{net}$ is net stress acting on the fracture. The additional terms such as the hydrostatic, friction and fracture pressure contributions, etc., may come from appropriate models. Such models may include, for example, non-Newtonian friction models, perforation friction models, tortuosity friction models and PKN/KGD (Perkins-Kern-Nordgren/Khristianovic-Geertsma-de. Klerk) type of models, or any other suitable models, as would be understood by those ordinarily skilled in the art having the benefit of this disclosure. Further, if additional downhole pressure data is available, that data can be used by the system to extract wellbore friction.

Still at block 206, the hydrostatic pressure can be computed as $P_h$=p g TVD, where p is the density, TVD is the total vertical depth and g is the acceleration due to gravity. Here, in some exemplary embodiments, simplification of the mathematical calculations can be achieved by assuming the fracture pressure is negligible, the net stress acting on the fracture is constant and the friction pressure remains constant for the duration of fracture operation where rate and fluid properties are constant.

Figure 3:
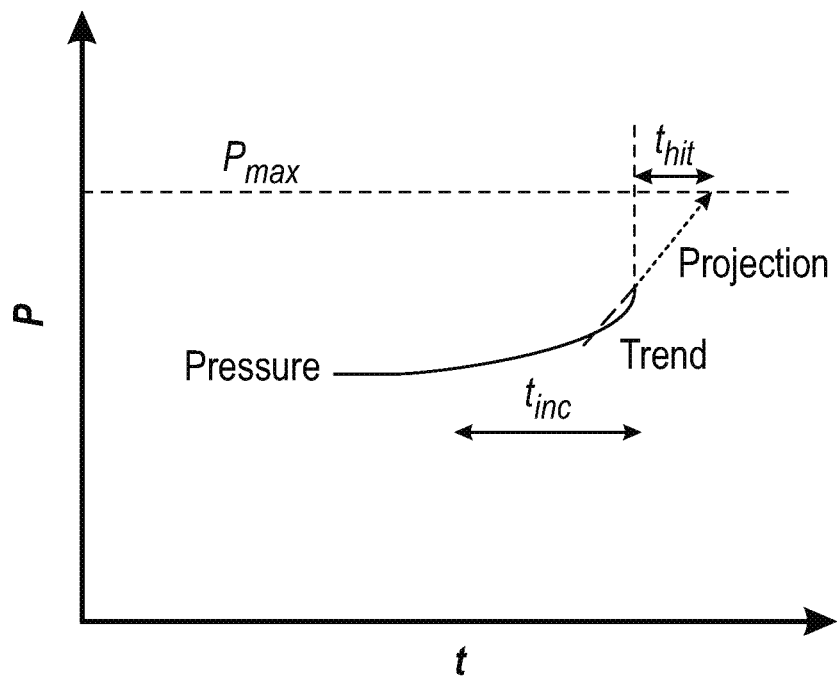
FIG. 3 is a graph of a pressure response trend useful to illustrate block 212 of the present disclosure.

At block 210 the system prepares (or predicts) the pressure response trend by projecting the trajectory of $\tilde{P}$ at block 210. FIG. 3 is a graph of a pressure response trend useful to illustrate block 210 of the present disclosure. If the system determines the trajectory is flat or in a downward trend, the system continues to monitor the pressure responses. However, if the system determines the trajectory is in a positive or upward direction (i.e., increasing trend), the system will then estimate the time ($t_{hit}$) it takes for the P+Δ$\tilde{P}$ to exceed the maximum allowable pressure. The maximum allowable pressure may come from equipment/operational safety criteria or from some other criteria. The system also computes the wellbore traverse time ($t_{sweep}$)—i.e., the time it requires to move one wellbore volume of fluid at the present slurry rate.

Still referencing block 210, if the system determines $$t_{ratio} = \frac{t_{hit}}{t_{sweep}} \le C_1,$$

then a screen out is predicted or detected at block 212 and corrective/mitigative action is needed. $C_1$ refers to the value of the $t_{ratio}$ above which no correction action is needed (otherwise corrective/mitigation action is needed). An example value of $C_1$ can be 1 or 1.1 etc. The value of $C_1$ may remain fixed or may vary during the fracturing operation—for example one may adapt smaller value of $C_1$ such as 0.5 at the early part of the proppant pumping and may employ higher value at the later part etc. The corrective action depends on the value of $t_{ratio}$. If $t_{ratio}>C_1$, they system monitors the time duration ($t_{inc}$) for which the trajectory has remained positive. If the duration exceeds $t_{sweep}$ by a certain factor (e.g., $t_{inc} \ge C_2 \, t_{sweep}$), a far field screen-out type is detected and a suitable corrective action would be taken if needed. Far field screen-out occurs when the screen-out is happening in the fractures away from the wellbore, for example at the tip of the fracture. In one example, the system automatically recommends or initiates the mitigation operation. For this scenario, additional constraints can also utilized, for example, a total pressure raise (Δ$\tilde{P}$) of at least 200 psi during $t_{inc}$, or $$\frac{\Delta \tilde{P}}{P_{max} - P} > C_3,$$

with a known $C_3$ for example 0.5 etc. The corrective measure can depend on value on $t_{inc}/t_{sweep}$ and/or on $$\frac{\Delta \tilde{P}}{P_{max} - P}.$$

At block 214, the system determines a suitable corrective action to be taken. In certain illustrative methods, the corrective operations may include some modification of the pumping schedule. This process is repeated until the wellbore is free of proppant or the fracture operation otherwise concludes. In certain other illustrative methods, the mitigation actions may include reduction of slurry pumping rate, reduction or holding the proppant concentration steady, altering the rheological properties of the fluid (e.g., changing friction reducer or gel concentration) or application of a chemical (e.g., acid) etc. The mitigation plan may come from a databased model, a tuned physics based model or as a table provided by the user.

Figure 4:
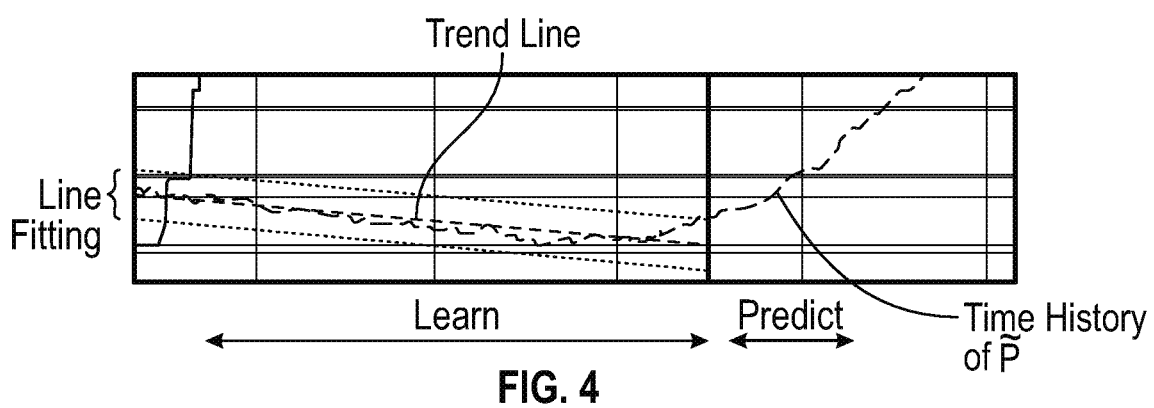
FIG. 4 is a graph illustrating an illustrative curve fitting trend line of the present disclosure.

With reference back to block 212, a more detailed discussion of how the system projects the trajectory of the pressure response will now be provided. In certain illustrative embodiments, the projection of the current trend to detect the screen-out may happen through a curve fitting process, a tuned physics based model or data driven model. FIG. 4 is a graph illustrating an illustrative curve fitting trend line of the present disclosure. For illustration purposes, an adaptive curve fitting process is applied to identify the trend from a noisy signal as follows: first, the system obtains the time history of $\tilde{P}$ as indicated by the curve in FIG. 4. The system then partitions the data into 'Learn' and 'Predict' bins. For the 'Learn' bucket, a trend line is fit (as indicated by dotted lines) along the data in the learn bucket as a linear line. A linear line fitting may involve fitting a line using the following equation:

$$\bar{p}=bt+c(1), \quad \text{Eq. 2,}$$

Where $\bar{p}$ is the linear estimate of the pressure y-axis variable, b is the slope of the straight line, t is the time -x-axis variable, and c is the intercept (value of y-axis variable when x-axis variable is zero). The linear line fitting applies Equation 2 such that the error $\Sigma(\bar{p}(t_i)-\tilde{P}(t_i))^2$ is minimized. Here $\bar{p}(t_i)$ is the linear fit to the data recorded data $\tilde{P}(t_i)$. Next, the system determines an appropriate confidence interval on the fit. For example, a standard deviation may be computed as:

$$\sigma = \sqrt{\frac{\sum(\bar{p}(t_i) - p(t_i))^2}{N-1}}, \quad \text{Eq. 3}$$

with N being the number of samples in the 'Learn' dataset. Then a confidence interval can be defined as $\bar{p} \pm c_m \sigma$, where $c_m$ represents a multiplier, typically ~2.5-3. The confidence interval is shown in the dotted lines in FIG. 4. Therefore, the system applies Equation 1 to project the trend to detect $t_{hit}$ and $t_{inc} = t_{inc} + t_{learn}$ if b>0, else 0.

Figure 5:
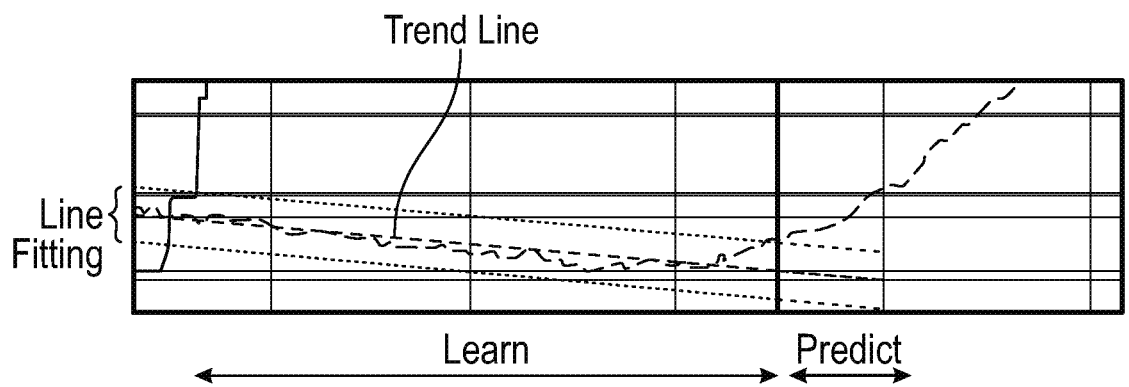
FIG. 5 is another graph illustrating how the system appropriately sets the time variable "t" in the regression fit used to test the trend line.

Next, to extend the linear fit and the bounds into the Predict dataset, the system appropriately sets the time variable "t" in the regression fit as shown in FIG. 5 which is used to test the trend line. In FIG. 5, the trends from the "learn" are extended to "predict" to determine if the trend is applicable to the "predict" region or not. In this example, it does not, as the values in the predict region fall outside of confidence interval.

If the system determines the regression fit describes the "Predict" set within the confidence interval, then the 'Predict' set is absorbed into the "Learn" set, and the procedure is repeated, with new "Learn" and "Predict" datasets using the new parent pressure recording. In the case "Predict" falls outside the confidence interval, the "Predict" portion will become the new "Learn" set and the process is repeated.

For every past "Learn" period, the system stores (b, c, $t_{start}$, $t_{end}$) until at least $\Sigma(t_{end}-t_{start}) \geq C_2 t_{sweep}$, where b is the slope of the liner fit, $C_2$ is the factor described above which determines if a far field type screen-out is happening, $T_{start}$ is the time at the start of the "learn" period and $t_{end}$ is the time at the end of the "learn" period. Then $t_{inc} = \Sigma(t_{end}-t_{start})$ for a positive 'b' until a negative 'b' is encountered while going over the stored "Learn" set in reverse chronological order, where $t_{inc}$ is the net time elapsed for the duration where pressure is increasing. The net pressure change can be computed as $\Delta \tilde{P} = \Sigma b(t_{end}-t_{start})$ or by any other suitable methods.

The foregoing illustrative method described a pressure trend mathematical model used to detect and/or predict screen outs. Now, an illustrative data-based mathematical model to detect and/or predict screen outs will be described. The data-based model may be developed using data of past/historic fracturing operations. In one example, the data-based model may be trained by providing data that may have information about where screen-out may or may not exist. The information may come from a variety of sources such as, for example, subject matter experts or from an algorithm that detects anomalies or any other suitable approaches. The data that goes into developing the model may further involve: geographical location, well construction details or well geometry; data on tests prior to the fracking operations, for example mini-frac, DFIT (diagnosis fracture injection test) and step-down tests, etc.; treatment parameters such as, for example, slurry rate, proppant concentration, proppant type, fluid composition (e.g., friction reducer concentration, friction reducer type, etc), clean fluid densities (or any other measures to characterize the clean fluids such as, for example, total dissolved solids), slurry densities etc. The treatment parameters can be bucketed into different categories, for example, break-down related parameters, pad stage parameters, proppant stage parameters, etc. The parameters may involve any derived information from these measurements such as, for example, slope of the slurry rate during a specific stage of the operation or any combination (e.g., horse power).

Other parameters used to train the data-based model may further include stage specific parameters such as measured depth, true vertical depth, cluster design (e.g., stage length, cluster spacing, number of clusters, number of perforations, perforation diameter, etc.) etc; measured parameters including surface and bottomhole pressure, both high and low frequency, fiber optic measurements (flow and strain, etc), microseismic measurements, nearby wells (parent or child) pressure, fiber measurements, etc.; previous stage information, similar to those previously discussed above and also may involve ISIP (instantaneous shut-in pressure); and any other features which can impact the fracturing process.

In with the other mathematical models described herein, the data-based model may detect the screen-out in real time or in advance and may recommend appropriate control or mitigation techniques. For example, as a real time control, the data-base model may respond to an ongoing screen-out event and may modify rate, proppant concentration or fluid composition to mitigate the screen-out. A real time screen out detection mode may involve the data-based model classifying a current pressure response signal or combination of signals, for example surface pressure, parent-child well pressure, etc. as an anomaly or not. Any variety of other suitable approaches can also be adopted.

In a predictive operation, the data-based model may compute the probability of screen-out happening in the future and may take an action before the onset of screen-out. This might involve sending down proppant slugs or altering fluid viscosity or modifying the treatment plan. A predictive mode model may also employ approaches such as, for example, learning the relationship between pressure responses and a set of controllable and fixed features. For example, $p=f(c_1, c_2, \ldots, nc_1, nc_2 \ldots)$, where the function represents the relationship between response function pressure (in this illustration) controlled variable set (denoted by: $c_1, c_2 \ldots$ which may represent slurry rate, proppant concentration, etc) and non-controlled variable set (denoted by:$nc_1, nc_2 \ldots$, which may include location of the wellbore, diameter of the wellbore, etc.) derived from a machine learning algorithm. With complete knowledge of future courses of action on controllable features, the model may predict if an anomaly is expected to occur. The methods may involve regression, forecasting, artificial neural networks, decision tree, or any other suitable data-based or machine learning model approach, as will be understood by those having ordinary skill in the art having the benefit of this disclosure.

In yet other illustrative embodiments, the mathematical model may include a combination of both data-based and pressure-trend based models, where the prediction from each type of model can be combined together into a single recommendation by a suitable merging technique. One example of merging may involve weight averaging the prediction performance of the different models, where the weights can be inferred by comparing the performances of the models to the historic fracture data. In yet another example, the mathematical models can also be trained continuously as the fracking continues on the field and as more data is gathered.

Figure 6:
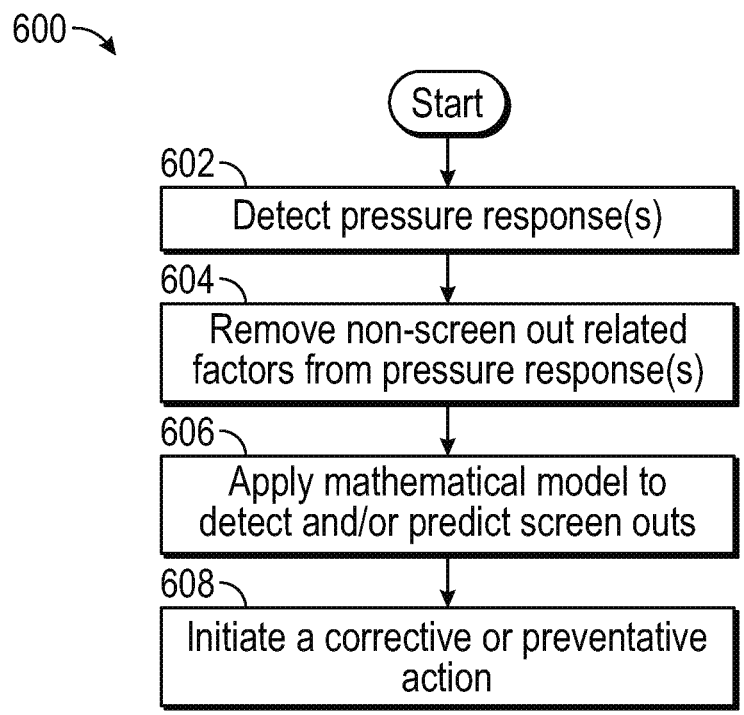
FIG. 6 is a flow chart of a generalized method for detecting and/or predicting a screen out during a fracture operation, according to certain illustrative methods of the present disclosure.

FIG. 6 is a flow chart of a generalized method for detecting and/or predicting a screen out during a fracture operation, according to certain illustrative methods of the present disclosure. Block 602 of method 600 first detects one or more pressure responses generated by a well during a fracture operation. The pressure response includes a variety of factors contributing to the pressure response such as, for example, hydrostatic, frictional and density factors. At block 604, the system removes the effects of non-screen out related factors. At block 606, the system then applies a mathematical model to the pressure response to detect or predict a screen out. As described herein, the mathematical model may take the form of a pressure trend model or data-based model, or a combination of both, for example. Here, the system first determines whether a screen out has occurred. In those cases where no screen out has occurred, the system then predicts (using those same mathematical models) whether a screen out will occur in the future. At block 608, responsive to the screen out detection or prediction, the system then initiates a corrective or preventative action such as, for example, a downhole operation in which the proppant concentration is adjusted, or the treatment plan is modified.

Figure 7A:
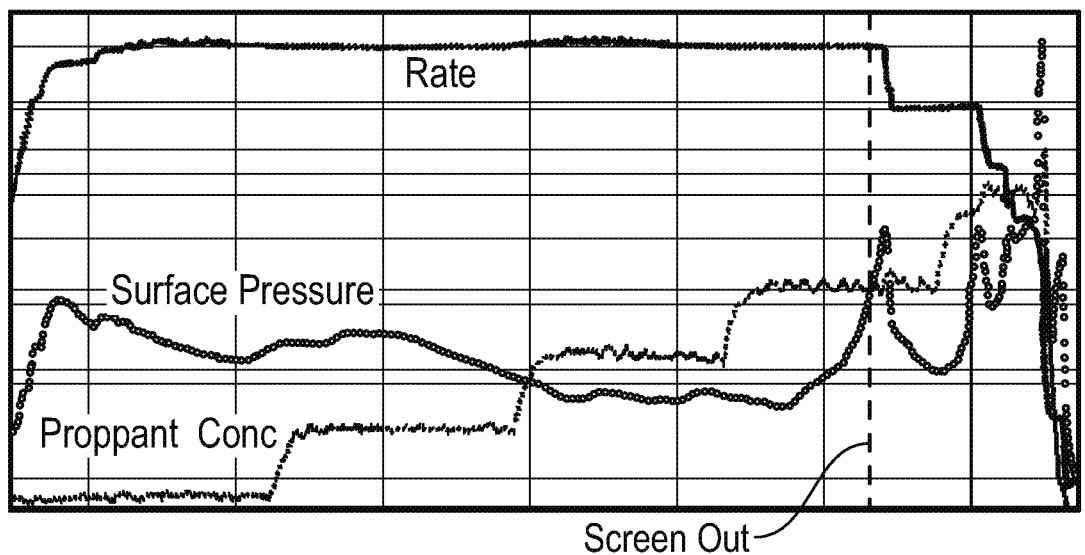
FIG. 7A is a graph showing the magnitude (y-axis) of operational variables over time (x-axis) are adjusted by the system of the present disclosure.
Figure 7B:
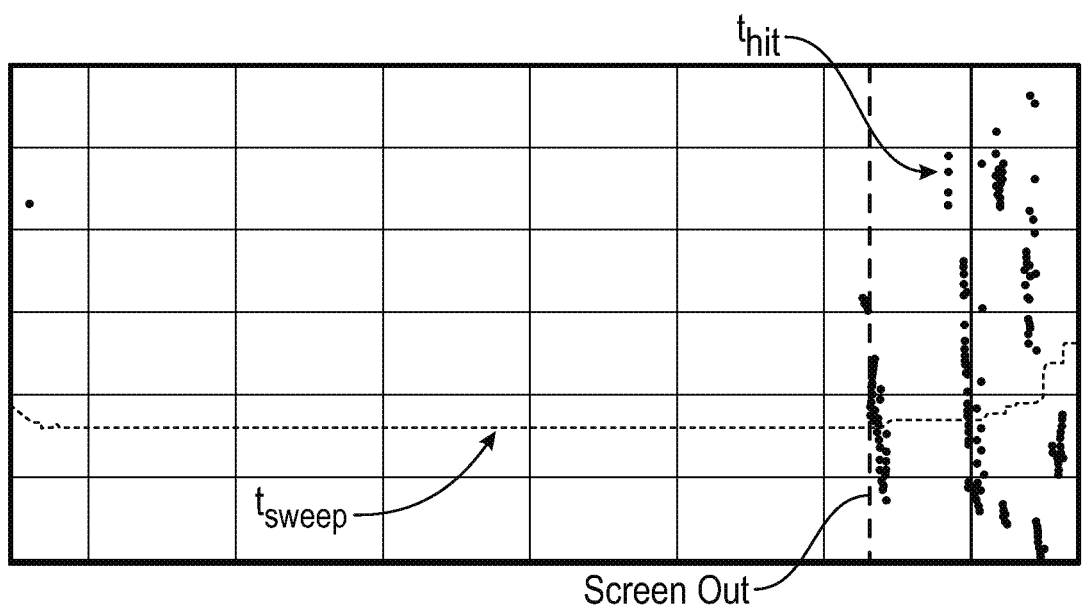
FIG. 7B is another graph showing the estimated time ($t_{hit}$) it takes for the pressure to exceed the maximum allowable pressure.

FIGS. 7A and 7B are graphs illustrating an example of a method described herein. The graph of FIG. 7A shows the magnitude (y-axis) of operational variables over time (x-axis). Those variables are rate, surface pressure and proppant concentration. The graph of FIG. 7B shows the estimated time ($t_{hit}$) it takes for the $P+\Delta \hat{P}$ to exceed the maximum allowable pressure. $t_{hit}$ and the wellbore sweep are identified. The vertical line passing through both graphs shows when the screen out is first detected by the system. Thereafter, the system initiates mitigative actions by, for example, reducing the pump rate and surface pressure.

Figure 8:
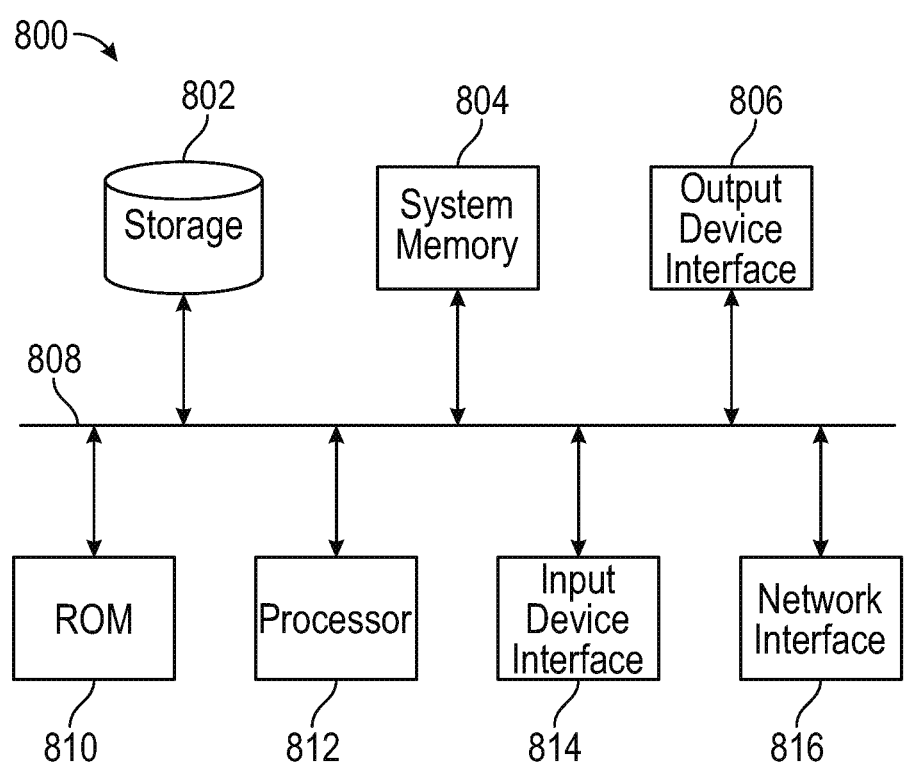
FIG. 8 is a block diagram of an exemplary computer system in which embodiments of the present disclosure may be implemented.

FIG. 8 is a block diagram of an exemplary computer system 800 in which embodiments of the present disclosure may be implemented. For example, the injection control subsystem 111 (or data processing components thereof) of FIG. 1 and the steps of processes described herein may be implemented using system 800. System 800 can be a computer, phone, PDA, or any other type of electronic device. Such an electronic device includes various types of computer readable media and interfaces for various other types of computer readable media. As shown in FIG. 8, system 800 includes a permanent storage device 802, a system memory 804, an output device interface 806, a system communications bus 808, a read-only memory (ROM) 810, processing unit(s) 812, an input device interface 814, and a network interface 816.

Bus 808 collectively represents all system, peripheral, and chipset buses that communicatively connect the numerous internal devices of system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of system 800. Permanent storage device 802, on the other hand, is a read-and-write memory device. This device is a non-volatile memory unit that stores instructions and data even when system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for computer aided pipe string design based on existing string designs in accordance with some implementations. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the system 800. Input devices used with input device interface 814 include, for example, alphanumeric, QWERTY, or T9 keyboards, microphones, and pointing devices (also called "cursor control devices"). Output device interfaces 806 enables, for example, the display of images generated by the system 800. Output devices used with output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 8, bus 808 also couples system 800 to a public or private network (not shown) or combination of networks through a network interface 816. Such a network may include, for example, a local area network ("LAN"), such as an Intranet, or a wide area network ("WAN"), such as the Internet. Any or all components of system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes described above may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Embodiments and methods of the present disclosure described herein further relate to any one or more of the following paragraphs:

1. A method to detect or predict a screen out during downhole fracturing operations, the method comprising detecting a pressure response generated by a well during a fracture operation, the pressure response comprising one or more factors contributing to the pressure response; removing, from the pressure response, effects of non-screen out related factors; applying a mathematical model to the pressure response to detect or predict a screen out; and in response to the screen out detection or prediction, initiating a corrective action.

2. The method as defined in paragraph 1, wherein applying the mathematical model comprises calculating a trajectory of the pressure response; and detecting or predicting a screen out based upon the trajectory of the pressure response.

3. The method as defined in paragraphs 1 or 2, wherein the screen out is detected or predicted by determining whether the trajectory of the pressure response is in an upward or downward trend; if the trajectory of the pressure response is in an upward trend, calculating a time it will take the pressure response to exceed a maximum allowable pressure; and based upon the calculated time to exceed the maximum allowable pressure, detecting or predicting the screen out.

4. The method as defined in any of paragraphs 1-3, further comprising calculating a time it will take a volume of wellbore fracturing slurry to traverse the well using a defined slurry rate; and based upon the calculated time to exceed the maximum allowable pressure and the calculated time it will take the volume of wellbore fracturing slurry to traverse the well, detecting or predicting the screen out.

5. The method as defined in any of paragraphs 1-4, wherein the trajectory of the pressure response is calculated by obtaining historical data of pressure responses of the well; partitioning the data into a learn dataset and a predict dataset; fitting a trend line along the learn dataset; determining a confidence interval based upon the trend line; and applying the confidence interval to the predict dataset to thereby calculate the trajectory of the pressure response.

6. The method as defined in any of paragraphs 1-5, wherein applying the mathematical model comprises comparing the pressure response to modeling data to identify anomalous data that indicates a screen out, wherein the modeling data is generated through training of the mathematical model using historical fracturing data.

7. The method as defined in any of paragraphs 1-6, wherein the non-screen out related factors comprise one or more of a density or friction factor.

8. The method as defined in any of paragraphs 1-7, wherein the corrective action comprises one or more of: reduction of slurry rate, altering a proppant concentration, altering rheologic properties of a fracturing slurry, or application of a chemical to the fracturing slurry.

9. The method as defined in any of paragraphs 1-8, wherein the mathematical model utilizes historical data, pressure trend data, or a combination of historical and pressure trend data to detect or predict the screen out.

10. A system to detect or predict a screen out during fracturing operations, the system comprising a pressure gauge to obtain one or more pressure responses from a downhole well; and processing circuitry communicably coupled to the pressure gauge and operable to perform an operation comprising: detecting a pressure response generated by the well during a fracture operation, the pressure response comprising one or more factors contributing to the pressure response; removing, from the pressure response, effects of non-screen out related factors; applying a mathematical model to the pressure response to detect or predict a screen out; and in response to the screen out detection or prediction, initiating a corrective downhole operation.

11. The system as defined in paragraph 10, wherein applying the mathematical model comprises calculating a trajectory of the pressure response; and detecting or predicting a screen out based upon the trajectory of the pressure response.

12. The system as defined in paragraphs 10 or 11, wherein the screen out is detected or predicted by determining whether the trajectory of the pressure response is in an upward or downward trend; if the trajectory of the pressure response is in an upward trend, calculating a time it will take the pressure response to exceed a maximum allowable pressure; and based upon the calculated time to exceed the maximum allowable pressure, detecting or predicting the screen out time.

13. The system as defined in any of paragraphs 10-12, further comprising calculating a time it will take a volume of wellbore fracturing slurry to traverse the well using a defined slurry rate; and based upon the calculated time to exceed the maximum allowable pressure and the calculated time it will take the volume of wellbore fracturing slurry to traverse the well, detecting or predicting the screen out time.

14. The system as defined in any of paragraphs 10-13, wherein the trajectory of the pressure response is calculated by obtaining historical data of pressure responses of the well; partitioning the data into a learn dataset and a predict dataset; fit a trend line along the learn dataset; determining a confidence interval based upon the trend line; and applying the confidence interval to the predict dataset to thereby calculate the trajectory of the pressure response.

15. The system as defined in any of paragraphs 10-14, wherein applying the mathematical model comprises comparing the pressure response to modeling data to identify anomalous data that indicates a screen out, wherein the modeling data is generated through training of the mathematical model using historical fracturing data.

16. The system as defined in any of paragraphs 10-15, wherein the non-screen out related factors comprise one or more of a density or friction factor.

17. The system as defined in any of paragraphs 10-16, wherein the corrective downhole operation comprises one or more of: reduction of slurry rate, altering a proppant concentration, altering rheologic properties of a fracturing slurry, or application of a chemical to the fracturing slurry.

18. The system as defined in any of paragraphs 10-17, wherein the mathematical model utilizes historical data and pressure trend data to detect or predict the screen out.

Furthermore, the exemplary methodologies described herein may be implemented by a system including processing circuitry or a non-transitory computer program product including instructions which, when executed by at least one processor, causes the processor to perform any of the methodology described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method to detect or predict a screen out during downhole fracturing operations, the method comprising:
    detecting a pressure response generated by a well during a fracture operation, the pressure response comprising one or more factors contributing to the pressure response;
    removing, from the pressure response, effects of non-screen out related factors, wherein the non-screen out related factors comprise one or more of a density or friction factor;
    applying a mathematical model to the pressure response to detect or predict a screen out; and
    in response to the screen out detection or prediction, controlling an injection system with a computer generated response to the injection system to change at least one of a flow rate, a pressure, a proppant concentration, a chemical concentration, a diverter concentration, and a parameter during the fracture operation.

2. The method as defined in claim 1, wherein applying the mathematical model comprises:
    calculating a trajectory of the pressure response; and
    detecting or predicting a screen out based upon the trajectory of the pressure response.

3. The method as defined in claim 2, wherein the screen out is detected or predicted by:
    determining whether the trajectory of the pressure response is in an upward or downward trend;
    if the trajectory of the pressure response is in an upward trend, calculating a time it will take the pressure response to exceed a maximum allowable pressure; and
    based upon the calculated time to exceed the maximum allowable pressure, detecting or predicting the screen out.

4. The method as defined in claim 3, further comprising:
    calculating a time it will take a volume of wellbore fracturing slurry to traverse the well using a defined slurry rate; and
    based upon the calculated time to exceed the maximum allowable pressure and the calculated time it will take the volume of wellbore fracturing slurry to traverse the well, detecting or predicting the screen out.

5. The method as defined in claim 2, wherein the trajectory of the pressure response is calculated by:
    obtaining historical data of pressure responses of the well;
    partitioning the data into a learn dataset and a predict dataset;
    fitting a trend line along the learn dataset;
    determining a confidence interval based upon the trend line; and
    applying the confidence interval to the predict dataset to thereby calculate the trajectory of the pressure response.

6. The method as defined in claim 1, wherein applying the mathematical model comprises:
    comparing the pressure response to modeling data to identify anomalous data that indicates a screen out, wherein the modeling data is generated through training of the mathematical model using historical fracturing data.

7. The method as defined in claim 1, wherein the parameter comprises: reduction of slurry rate, altering a proppant concentration, altering rheologic properties of a fracturing slurry, or application of a chemical to the fracturing slurry.

8. The method as defined in claim 1, wherein the mathematical model utilizes historical data, pressure trend data, or a combination of historical and pressure trend data to detect or predict the screen out.

9. A system to detect or predict a screen out during fracturing operations, the system comprising:
a pressure gauge to obtain one or more pressure responses from a downhole well; and
processing circuitry communicably coupled to the pressure gauge and operable to perform operations comprising:
detecting a pressure response generated by the well during a fracture operation, the pressure response comprising one or more factors contributing to the pressure response;
removing, from the pressure response, effects of non-screen out related factors, wherein the non-screen out related factors comprise one or more of a density or friction factor;
applying a mathematical model to the pressure response to detect or predict a screen out; and
in response to the screen out detection or prediction, controlling an injection system with a computer generated response to the injection system to change at least one of a flow rate, a pressure, a proppant concentration, a chemical concentration, a diverter concentration, and a parameter during the fracture operation.

10. The system as defined in claim 9, wherein applying the mathematical model comprises:
calculating a trajectory of the pressure response; and
detecting or predicting a screen out based upon the trajectory of the pressure response.

11. The system as defined in claim 10, wherein the screen out is detected or predicted by:
determining whether the trajectory of the pressure response is in an upward or downward trend;
if the trajectory of the pressure response is in an upward trend, calculating a time it will take the pressure response to exceed a maximum allowable pressure; and
based upon the calculated time to exceed the maximum allowable pressure, detecting or predicting the screen out time.

12. The system as defined in claim 11, further comprising:
calculating a time it will take a volume of wellbore fracturing slurry to traverse the well using a defined slurry rate; and
based upon the calculated time to exceed the maximum allowable pressure and the calculated time it will take the volume of wellbore fracturing slurry to traverse the well, detecting or predicting the screen out time.

13. The system as defined in claim 10, wherein the trajectory of the pressure response is calculated by:
obtaining historical data of pressure responses of the well;
partitioning the data into a learn dataset and a predict dataset;
fit a trend line along the learn dataset;
determining a confidence interval based upon the trend line; and
applying the confidence interval to the predict dataset to thereby calculate the trajectory of the pressure response.

14. The system as defined in claim 9, wherein applying the mathematical model comprises:
comparing the pressure response to modeling data to identify anomalous data that indicates a screen out, wherein the modeling data is generated through training of the mathematical model using historical fracturing data.

15. The system as defined in claim 9, wherein the parameter comprises: reduction of slurry rate, altering a proppant concentration, altering rheologic properties of a fracturing slurry, or application of a chemical to the fracturing slurry.

16. The system as defined in claim 9, wherein the mathematical model utilizes historical data and pressure trend data to detect or predict the screen out.

17. A non-transitory computer readable medium comprising instructions which, when executed by at least one processor, causes the processor to perform a method comprising:
detecting a pressure response generated by a well during a fracture operation, the pressure response comprising one or more factors contributing to the pressure response;
removing, from the pressure response, effects of non-screen out related factors, wherein the non-screen out related factors comprise one or more of a density or friction factor;
applying a mathematical model to the pressure response to detect or predict a screen out; and
in response to the screen out detection or prediction, controlling an injection system with a computer generated response to the injection system to change at least one of a flow rate, a pressure, a proppant concentration, a chemical concentration, a diverter concentration, and a parameter during the fracture operation.

18. The computer readable medium as defined in claim 17, wherein the mathematical model utilizes historical data or pressure trend data to detect or predict the screen out.

* * * * *